Oct. 27, 1970   W. W. FICHTENBERG   3,536,339
VERTICALLY ADJUSTABLE WHEELED TRAILER
Filed July 17, 1968   2 Sheets-Sheet 1
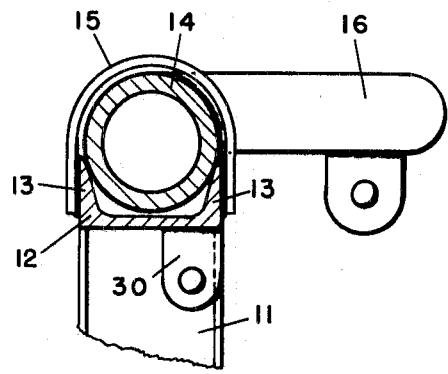
FIG-7
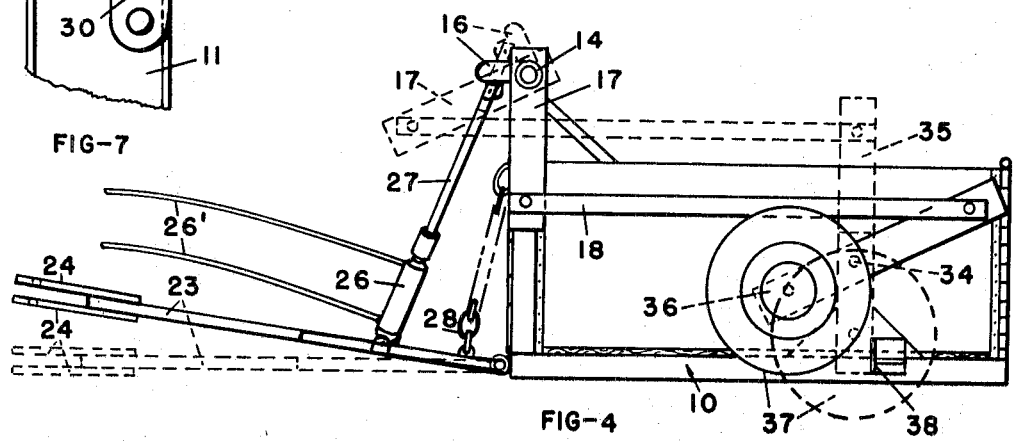
FIG-4
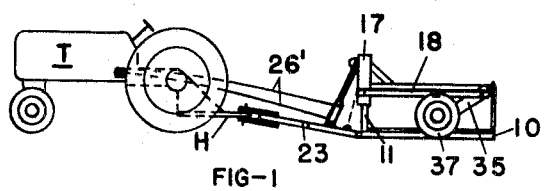
FIG-1
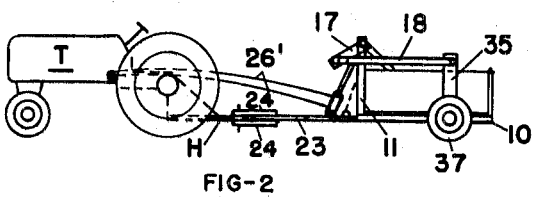
FIG-2
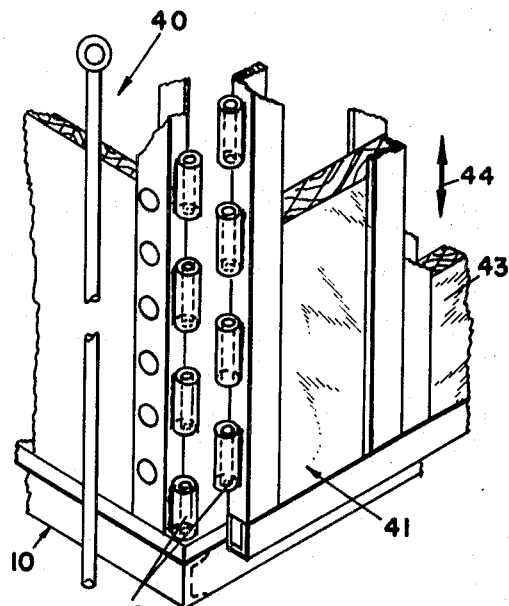
FIG-6
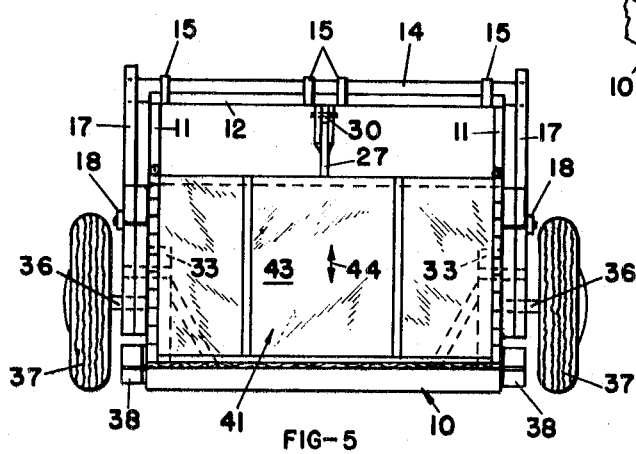
FIG-5
INVENTOR.
Willie W. Fichtenberg
BY

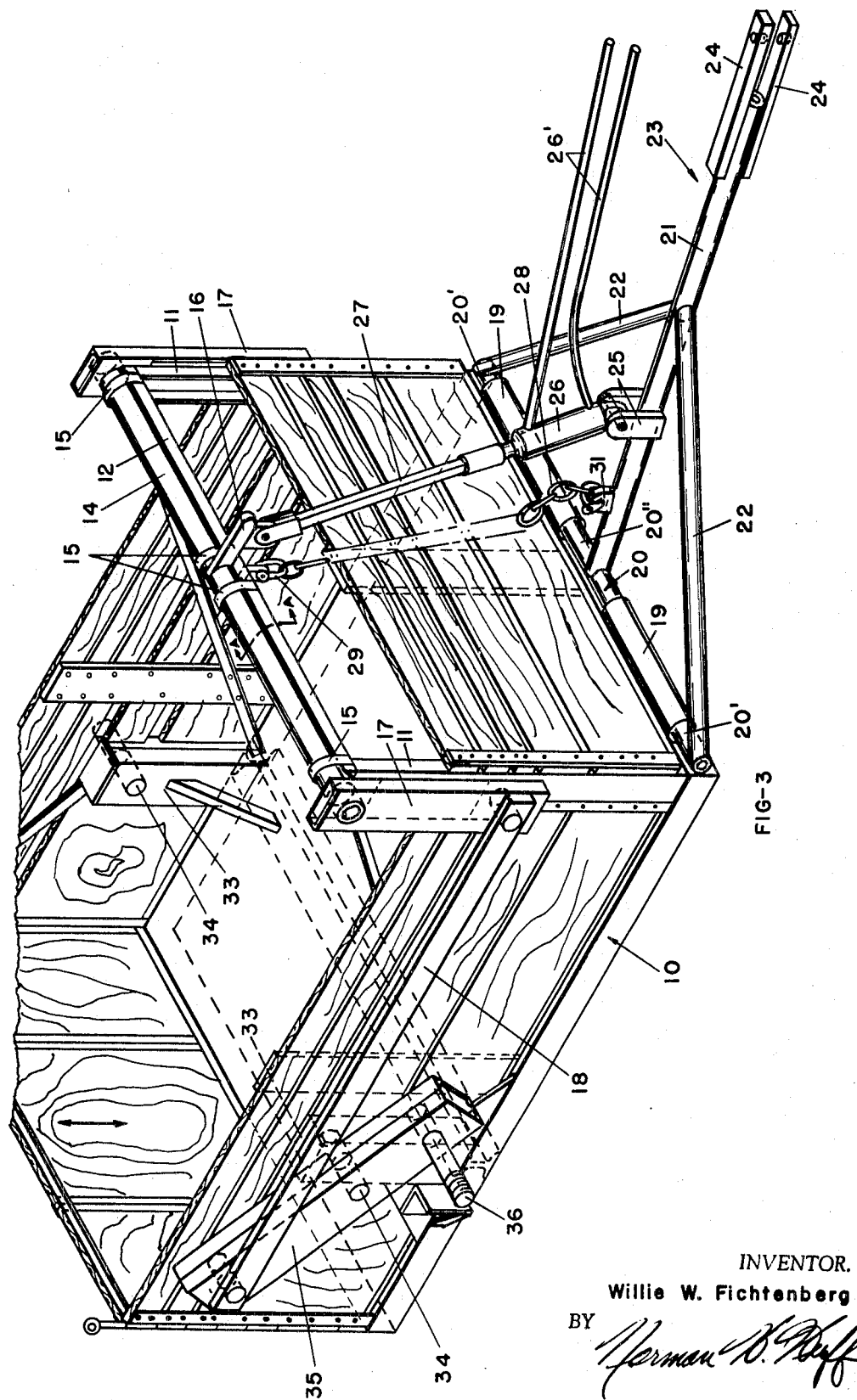

United States Patent Office 3,536,339
Patented Oct. 27, 1970

3,536,339
VERTICALLY ADJUSTABLE WHEELED TRAILER
Willie W. Fichtenberg, Rte. 2, Box 157,
Spokane, Wash. 99207
Filed July 17, 1968, Ser. No. 745,480
Int. Cl. B62d 53/00
U.S. Cl. 280—414.5                                8 Claims

ABSTRACT OF THE DISCLOSURE

A wheeled trailer having wheels movable to raised and lowered positions by means of a prime mover having its reactance forces directed to tilt the pivoted drawbar whereby to alternately raise the trailer for transporting upon its wheels and when resting upon the ground to elevate the drawbar for hitching purposes.

---

My present invention relates generally to agricultural machinery and more particularly to trailers which are intended to be transported from place to place wherein the frames thereof may be lowered to facilitate loading and unloading and raised for movement upon its running gear.

In the practice of agricultural pursuits, one frequently is required to transport heavy machinery and products from place to place as when moving a tractor and/or implements from one field to another. Moreover, in the realm of animal husbandry, it is often desirable to move livestock from one place to another as for example, from a pasture to market.

One of the greatest difficulties encountered in such transporting of machinery and livestock is loading and unloading the respective ladings at the most convenient location, i.e., where it is found or desired to be placed.

Heretofore, in the case of machinery, one has found it necessary to move the equipment to a ramp by means of which it could be elevated and moved onto a trailer or truck designed to transport it over a desired distance. Lacking a ramp, and where feasible by reason of light weight, a hoist has been required to lift the equipment and place it on the transporting vehicle. In the case of livestock, the ramp or chute is the device most frequently employed.

In each case, it becomes necessary to get the heavy machinery and livestock from the location for the time being to a suitable ramp whereby it may be loaded. This is obviously time consuming especially when relatively great distances are involved, as for example, from a boundary of a large farm to the corral and machinery storage and handling complex which customarily is near the living quarters of the operator.

My invention has for its principal object the provision of a trailer structure having a frame uniquely fitted for lowering to rest upon the ground for loading and unloading and adapted to be raised upon wheels for transporting from place to place.

Another object of the invention lies in a novel drawbar construction which facilitates hitching the trailer to a tractor hitch by utilizing the prime mover for raising and lowering the trailer frame to also raise the unattached free end of the drawbar to alignment with said trailer hitch.

Yet another object of the present invention lies in the provision of a vertically adjustable wheeled trailer wherein the frame may be disposed in its wheel-supported position or ground supported position in both the tractor connected or disconnected relationship and furthermore, the trailer may be hitched or unhitched with facility in either the wheel-supported or ground supported condition of the frame.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should also be understood that various changes in construction may be resorted to in the course of manufacture without in any way departing from the spirit of the invention which is to be understood only in accordance with the appended claims. Furthermore, it is to be understood that while the invention is described in one particular association, it is not my intention to unnecessarily limit the applicability of the invention, but I desire to reserve to myself the claimed invention for every use of which it is now known or subsequently discovered to be susceptible.

Other advantages and features of this invention will become apparent from the more detailed description following in which like reference numerals are employed to designate similar parts in the accompanying drawings, wherein:

FIG. 1 is a line-drawing side elevation showing the trailer coupled to a tractor and having its frame in the ground-supported position;

FIG. 2 is a view similar to FIG. 1 but with the trailer frame in the wheel supported position;

FIG. 3 is an isometric view of the trailer embodying the present invention, upon an enlarged scale, and having parts removed for convenience of illustration;

FIG. 4 is a side elevation on a scale reduced from that of FIG. 3 and showing the frame in the ground supported position and, in phantom, the wheel supported position;

FIG. 5 is a rear elevation of the trailer with its frame in the ground supported position;

FIG. 6 is a fragmentary enlarged perspective of the cattle rack hinge which may be a part thereof; and FIG. 7 is a fragmentary enlarged vertical sectional view showing part of a corner post and details of the mounting structure for the rockable shaft supported thereon.

Having reference now in greater detail to the drawings, the numeral 10 designates a stiff, inflexible, rectangular in plan frame, which includes upright corner posts 11—11 one at each front corner to the upper ends of which a laterally extending channel member 12, having its flanges 13—13 extending upwardly, is secured as by welding, as best seen in FIGS. 3 and 7.

A laterally extending shaft 14 lies in the upwardly presented saddle formed by the channel 12 and extends beyond the terminal ends of the channel and thus projects laterally beyond the marginal sides of the frame 10. Plural confining bales or yokes 15 are welded to the channel 12 and extend over the shaft 14 to confine the shaft against appreciable movement laterally of its axis, while admitting of pivotal movement about its axis.

Midway the length of shaft 14 I have fixed, as by welding, a radially extending bracket 16 by means of which the shaft 14 is rocked about its axis. Secured to the end portions of shaft 14 are coincident radially extending crank arms 17—17 which, in the construction shown, depend therefrom at substantially 90 degrees from the radial disposition of the bracket 16. However, this relative radial disposition is of no great importance to the successful practice of the invention. It is sufficient to provide for rocking movement of the shaft 14 about its axis which will in turn swing the arms 17 and cause reciprocation of links 18—18 pivotally connected one to the free end of each arm 17.

Secured, as by welding, along the front edge of frame 10 I have provided spaced sleeves 19—19 which serves as journals for the laterally extending rod 20 which lies therein and extends from side to side of the frame 10 with its terminal end portions 20'—20' extending beyond their respective sleeve 19 and its central portion 20" extending between the inner spaced ends of said sleeves 19. A forwardly extending tongue member 21, welded or otherwise secured to the rod 20 midway its length and at the lateral center of frame 10, is laterally braced by angled members 22—22 welded or otherwise secured to the rod 20 at the end portions 20' and at the other ends of said braces to the tongue, intermediate its ends to form a rigid drawbar 23 terminating at its forward free end in spaced upper and lower bars 24—24, comprising a bifurcated hitch.

A pair of cooperating plates 25—25 are attached to the tongue 21 of drawbar 23 and constitute a mounting means to which the prime mover or double acting servo motor 26 is pivotally secured with respect to the drawbar 23. The piston rod 27 of the servo motor 26 is pivotally secured to the free end of the bracket 16. It will thus be seen that I have provided a drawbar 23 which is pivotally connected to the frame 10 for tilting movements in a vertical plane, and disposed a powered means 26-27 to exert formes to rotate shaft 14 through bracket 16 while the reaction forces effected by or through said power means tends to tilt the drawbar 23 about the axis of rod 20.

To limit the downward tilting movement of the drawbar 23 I provide a non-extensile but collapsible chain 28 securely fastened by means of a clevis 29 to a tongue 30 fixed to the channel 12 frame member and at the other end to the drawbar 23 at 31 in any convenient manner. The chain 28 is of such length as to permit the drawbar 23 to pivot downwardly to substantially horizontal alignment with frame 10, but limits this downward movement to provide means for transferring the reaction force of the expanding servo motor 26-27 to the frame so that it can effectively move bracket 16 and rotate shaft 14.

Spaced rearwardly on the frame 10 I provide rigid standards 33—33 which carry laterally extending coaxial journal pins 34—34 which in turn pivotally carry rocking arms 35—35 for rocking movements about an axis parallel to the axes of shaft 14 and rod 20 but spaced rearwardly of the trailer to provide the desired balance when only two wheels are employed to support the trailer.

At their upper ends, the rocking arms 35—35 are each pivotally connected to its respective link 18 and thereby are simultaneously as a unit moveable between the full line position of FIG. 4 and the broken line or phantom position thereof. Coaxial spindles 36—36 are fixed one to the lower end of each arm 35 and extend outwardly therefrom to rotatably receive the ground engaging wheels 37—37. As the arms 35 are rocked, counter clock-wise as viewed in FIG. 4, they pass over the weight center, or just slightly beyond dead center and then strike stops 38—38 fixed to the frame 10 and thus the weight of the trailer and its load is transferred directly to the trailer frame through the journal pins 34—34 and stops 38—38 and relieving the linkage 17 and 18 from this strain except to ensure the overcenter position of the arms 35.

A livestock rack 40 having a tailgate 41 hinged at each corner by means of interdigitating sleeves 42 and a manually removable hinge pin will facilitate directing livestock onto the trailer when it is positioned with the frame 10 on the ground adjacent to an existing fence and with the tailgate swung open at an angle diverging away from the fence from the distant corner of the trailer. It will be noted also that I have provided a central section 43 in the tailgate which can be slid vertically as indicated by the double arrow 44 when such restricted opening and gate is desired.

In operation, when the trailer frame is resting upon the ground as seen in FIG. 4, hydraulic fluid from a suitable source, usually, though not limited to, a fluid pump on tractor T is conventionally supplied through hoses 26' to shrink or withdraw the motor 26-27. Since the shaft 14 is already to the end of its counter clock-wise movement by reason of stops (not shown) on the frame against which arms 17 abut, the tongue is elevated to a selected height by manipulating the customary controls on the tractor for the hydraulic system. The coupling is thus made to the tractor hitch bar H by one man without necessitating manually lifting the tongue and simultaneously drawing one toward the other. It may all be accomplished by manipulation of the conventional tractor controls and then dropping a hitch pin through the aligned holes in customary manner.

The controls are then reversed to expand motor 26-27 whereupon the shaft 14 is rotated to the phantom position lowering the wheels 37 and raising the trailer and simultaneously the drawbar 23 is lowered to alignment with the frame 10 thus assisting in raising the frame 10 upon the wheels. When lowering the frame 10 the motor 26-27 is caused to contract and shorten thus raising the wheels to lower the trailer frame 10 to the ground.

Having thus described my invention I desire to secure by Letters Patent of the United States the following:

1. In a trailer:
   a frame;
   a shaft pivotally carried by the frame;
   means including ground engaging wheels movable relative to the frame and operably connected to said shaft for movement thereby between raised and lowered positions wherein said frame is alternately resting upon the ground and elevated for movement upon said wheels;
   said wheels being journaled upon spindles carried by arms each pivotally carried by said frame for rocking movements between an angular wheel-raised position and a substantially vertical overweight center wheel-lowered position;
   linkage means operably interconnecting said shaft and arms and constructed and arranged to impart said swinging movements to said wheels while maintaining the spindles in coaxial relationship to each other;
   a longitudinally extending drawbar for moving said trailer pivotally connected to said frame for vertical tilting movements;
   power means constructed and arranged to pivot said shaft to swing said wheels and impart the reaction forces thereof to tilt said draw bar; and
   means on the frame limiting the downward tilting movement of said drawbar to substantially horizontal alignment with said frame.

2. The trailer defined in claim 1 wherein the last-named means is a non-extensile elongated member extending between said frame and drawbar and adapted to support from the frame said drawbar against downward tilting movement beyond said alignment.

3. The invention defined in claim 2 wherein said drawbar support means is a chain.

4. The trailer defined in claim 1 wherein the power means is a fluid operated double acting servo motor connected at one end to pivot said shaft and at the other to tilt said drawbar.

5. The invention defined in claim 4 wherein the connections of said servo motor are constructed and arranged so that the reactance forces from the motor's effort to lower the wheels applies a downward moment to said drawbar.

6. The invention defined in claim 1 wherein there are stops on said frame limiting the movement of said arms in the wheel-lowered over-weight-center position to transfer the trailer weight supporting moment from the said arms directly through the stops to said frame, whereby to relieve the said linkage, shaft and power means.

7. The invention defined in claim 6 wherein said linkage comprises:
a pair of crank arms fixed to rotate with said shaft and extending radially therefrom; and
links pivotally connecting the free ends of said crank arms to the upper ends of said wheel supporting arms.

8. The invention defined in claim 7 wherein there is a radially extending bracket fixed to said shaft; and
said power means is pivotally connected to said bracket and thereby pivot said shaft.

References Cited

UNITED STATES PATENTS

| | | | |
|---|---|---|---|
| 2,711,329 | 6/1955 | Fritz | 280—414.5 |
| 2,806,710 | 9/1957 | Mascaro | 280—414.5 |
| 3,271,042 | 9/1966 | Flodin | 280—43.23 |

FOREIGN PATENTS 882,502  11/1961  Great Britain.

LEO FRIAGLIA, Primary Examiner

U.S. Cl. X.R.

280—43.23